United States Patent Office 3,328,693
Patented June 27, 1967

3,328,693
FORWARD-REVERSE RECTIFIER TEST APPARATUS HAVING AUXILIARY DIODE SHUNTED FUSE INDICATOR
Leon D. Yarbrough, Hawthorne, Calif., assignor to International Rectifier Corporation, El Segundo, Calif., a corporation of California
Filed May 13, 1964, Ser. No. 366,962
1 Claim. (Cl. 324—158)

This invention relates to a novel test circuit for rectifiers and more specifically is an improvement of application Ser. No. 366,479, filed May 11, 1964, entitled, Test Circuit for Rectifier Elements Having a Single Low-Voltage High-Current Transformer and Single High-Voltage Low-Current Transformer in the name of Jack Lyon and assigned to the assignee of the present invention.

More particularly, in the above noted application, a novel test circuit is provided for diodes wherein a fuse is connected in series with a diode under test with a fuse and diode both carrying forward normal current as well as normal rectifier reverse current. When the reverse current, however, exceeds some predetermined value, as due to failure of the diode, the fuse is caused to operate.

For this operation to proceed, the fuse RMS rating must slightly exceed the full cycle average current of the diode. Therefore, the rating and calibration of the fuses is relatively critical.

In accordance with the present invention, a second fixed diode is connected in series with the diode under test and in parallel with a fuse which will be opened upon the reverse voltage failure of the diode under test.

More particularly, the second diode operates to short circuit the fuse during forward current conduction of the test diode. Therefore, the fuse can be made very sensitive to an increase in reverse current from the rectifier under test due to the failure thereof. Thus, calibration of the fuse is substantially simplified and smaller fuses can be used since their RMS rating is considerably decreased.

Accordingly, a primary object of this invention is to provide a novel fuse circuit for a rectifier test system.

Another object or this invention is to permit the use of a small power rating of the fuses of a rectifier test circuit.

A still further object of this invention is to render the calibration of fuses for rectifier test circuits less sensitive.

These and other objects of this invention will become apparent from the following description when taken in connection with the drawings, in which.

Figure 1:
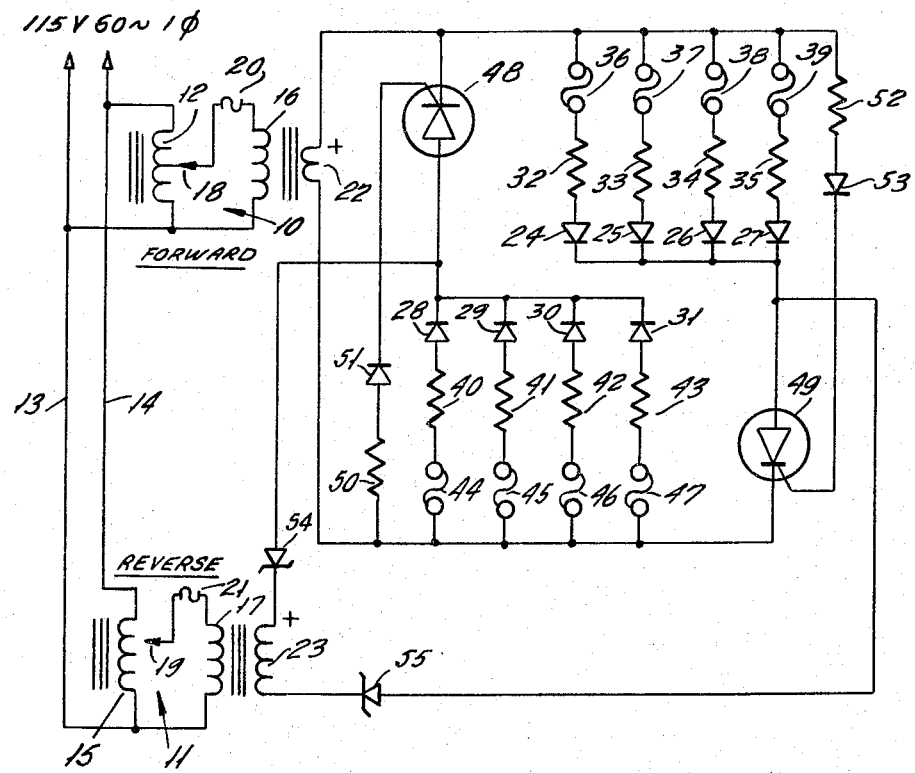
FIGURE 1 illustrates a rectifier test circuit.

Referring now to FIGURE 1, there is illustrated therein a rectifier test circuit which includes a forward voltage transformer system 10 and a reverse voltage transformer system 11. The forward voltage transformer system 10 includes primary winding 12 which is connected across lines 13–14 which could be the lines of a 115 volt 60 cycle source.

The reverse voltage transformer system 11 includes a similar primary winding 15 connected across lines 13 and 14.

Each of transformers 10 and 11 then have parallel windings 16 and 17, respectively, which are connected to their primary windings 12 and 15 by adjustable wiper arms 18 and 19, respectively, which are in series with fuses 20 and 21, respectively. Accordingly, the output voltage at windings 16 and 17 may be suitably adjusted, as desired, by moving wiper arms 18 and 19 in the usual and standard manner.

Each of windings 16 and 17 are then coupled to output windings 22 and 23, respectively, the phases of these two transformer systems being such that the tops of windings 22 and 23 will be the same polarity.

FIGURE 1 then shows two banks of rectifiers which are to be tested and which include a first bank of rectifiers 24, 25, 26 and 27 and a second bank of rectifiers 28, 29, 30 and 31. Each of rectifiers 24 through 27 are connected in series with load resistors 32 through 37, respectively, and fuses 36 through 39, respectively. In a similar manner, rectifiers 28 through 31 are connected in series with load resistors 40 through 43, respectively, and fuses 44 through 47, respectively.

Two thyristors 48 and 49 are then provided for switching the application of voltage from windings 22 and 23 to the two banks of rectifiers. The thyristor 48 has a gate firing circuit which extends from the bottom of winding 22 through resistor 50 and a diode 51. In a similar manner, thyristor 49 has a gate firing circuit which includes resistor 52 and diode 53. The anode of thyristor 48 is connected to the cathodes of the lower bank of rectifiers 28 through 31 and to the top of windings 23 through the Zener diode 54. In a similar manner, the anode of thyristor 24 is connected to the cathodes of the bank of rectifiers 24 through 27 and to the bottom of windings 23 through the Zener diode 55.

In operation and assuming that the tops of windings 22 and 23 are just becoming positive, a sufficient gate signal is applied to thyristor 49 through resistor 52 and diode 53 to cause thyristor 49 to become conductive. Therefore, a current path is established from the top of winding 22, which is a low voltage winding, through fuses 36 through 39, resistors 32 through 35, respectively, diodes 24 through 27 which are to be tested, thyristor 49 and back to the bottom of winding 22. This forward current through diodes 24 through 27 is mainly limited by the resistance of resistors 32 through 35, whereupon a large current equivalent to the rated forward current of diodes 24 through 27 is caused to flow at a relatively low voltage since winding 22 is a low voltage winding. Thus, relatively little power is expended during the forward voltage portion of the test.

While this forward current flows through rectifiers 24 through 27, the voltage winding 23 is applied in a reverse direction to diodes 28 through 31. Note that this portion of the circuit is not conductive since a negative signal is on the gate of thyristor 48. Thus, normally only the small reverse leakage current of the diodes flows in the reverse voltage test portion of the test circuit even though winding 23 has a sufficient voltage to test the PIV rating of rectifiers 28 through 38.

As the half cycle reverses and the lower part of windings 22 and 23 begins to go positive, the thyristor 49 will cease conduction and thyristor 48 will begin to conduct. Thus, forward current will now be applied to rectifiers 28 through 31 by the winding 22 while the rectifiers 24 through 27 will be exposed to reverse voltage from winding 23.

During the reverse voltage portion of the test, if one of the diodes 28 through 31 fails or conducts reverse current beyond some predetermined value, then its respective fuse will be operated and could subsequently be visually observed as corresponding to a faulty diode which can be removed or can operate some suitable signal device.

From the foregoing, it can be seen that each of fuses 36 through 39 and 44 through 47 will normally carry forward load current during the forward current operation of the test, but will carry only reverse current leakage during the reverse forward voltage of the test.

Clearly, by causing these fuses to be operated at the RMS equivalent current slightly above the full cycle average forward current, these fuses will be operated responsive to reverse voltage failure of their respective diodes which cause them to conduct currents greater than the normal reverse leakage current.

It will be apparent that a suitable test fixture can be provided for the simple connection and disconnection of fuses and rectifiers which are to be inserted into the test system. It is to be particularly noted that the Zener diodes 54 and 55 permit improved turn-off operation for the thyristors 48 and 49. That is to say, each of Zener diodes 54 and 55 are low voltage units connected in the reverse voltage circuits. The break-down voltage of each of Zener diodes 54 and 55, therefore, must first be reached before reverse voltage is applied to either of the banks and to the respective thyristors. Therefore, a reverse voltage pulse is initially applied to the thyristors, thereby creating a positive turn-off signal for the thyristor which may still continue to conduct when the voltage just begins to swing to a desired nonconducting condition.

As was seen above, the circuit of FIGURE 1 requires a relatively sensitive rating for the fuses 36 through 39 and 44 through 47.

Figure 2:
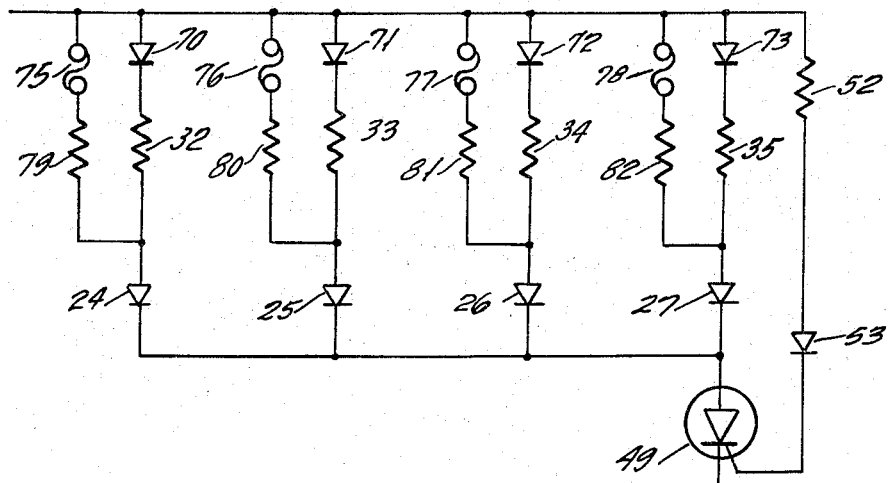
FIGURE 2 illustrates the manner in which the circuit of FIGURE 1 is modified in accordance with the present invention.

FIGURE 2 illustrates a circuit wherein the fuse rating is less critical and fuse operation is more positive than in the case of FIGURE 1. More specifically, FIGURE 2 illustrates one of the banks of rectifiers of FIGURE 2 along with a novel connection for their fuses. Thus, in FIGURE 2 the rectifiers 24 through 27 are shown with their respective load resistors 32 through 35 respectively.

In accordance with the modification of FIGURE 2, a second set of rectifiers 70 through 73, respectively, of known reliability, which is an integral part of the test equipment, are connected in series with rectifiers 24 through 27, respectively, which are the rectifiers to be tested.

The fuses for rectifiers 24 through 27 are then connected as fuses 75 through 78, respectively, which are in series with current limiting resistors 79 through 82, respectively, and in parallel with rectifiers 70 through 73, respectively. Where the circuit of FIGURE 1 is provided with the fuse connection of FIGURE 2, it will be apparent that the fuses 75 through 78 will no longer carry the full forward load current since they are short circuited by rectifiers 70 through 73, respectively, during forward current conduction. During the reverse voltage operation, once the reverse current of rectifiers 24 through 27 exceeds the reverse current of rectifiers 70 through 73, respectively, as would occur when one of rectifiers 24 through 27 fails under high reverse voltage, its respective fuse will conduct a relatively large current compared to its normal full cycle average current.

Therefore, this fuse will be immediately and positively operated, thus disconnecting the faulty rectifier elements 24, 25, 26 or 27 from the circuit and, if desired, giving an indication of the failure of the respective rectifier elements.

Although there has been described a preferred embodiment of this novel invention, many variations and modifications will now be apparent to those skilled in the art. Therefore, this invention is to be limited, not by the specific disclosure herein, but only by the appending claim.

The embodiments of the invention in which an exclusive privilege or property is claimed are defined as follows:

A rectifier test circuit comprising a first relatively high voltage source, a second relatively low voltage source, a first bank of parallel connected diode elements, a second bank of parallel connected diode elements, a first switching means, a second switching means; first and second control means connected to said first and second switching means respectively for operating said first and second switching means between conductive and nonconductive conditions; said first and second control means connected to said second and first voltage sources respectively; said first voltage source being connected in series with said first switching means and first bank of diode elements; said first voltage source being connected in series with said second switching means and said second bank of diode elements; the series connection of said first switching means and said first bank of diode elements connected in parallel with the series connection of said second switching means and said second bank of diode elements; said second voltage source being connected in series with said first bank of diode elements and said second switching means and in series with said first switching means and said second bank of diode elements; said first and second voltage sources being 180° phase displaced; said first switching means being rendered conductive by said first control means when said second voltage source assumes a forward conduction polarity for said second bank of diode elements and being rendered nonconductive when said second voltage source assumes a reverse conduction polarity for said second bank of diode elements; said second switching means being rendered conductive by said control means when said second voltage source assumes a forward conduction polarity for said first bank of diode elements and being rendered nonconductive when said second voltage source assumes a reverse conduction polarity for said first bank of diode elements; a parallel circuit connected in series with each of said diode elements of each of said first and second banks of diode elements; each of said parallel circuits including a parallel connected auxiliary diode and fuse; each of said auxiliary diodes connected to conduct forward current in the direction of forward current conduction of their respective series connected diodes; each of said fuses having an RMS current rating of the order of the average full cycle current rating of the reverse current of their said respective series connected diodes.

References Cited

UNITED STATES PATENTS

| 1,836,934 | 12/1931 | Morecroft | 324—119 |
| 2,584,800 | 2/1952 | Grisdale | 324—119 X |
| 2,868,997 | 1/1959 | Mitchell | 324—158 X |
| 3,045,168 | 7/1962 | Fellendorf | 340—250 X |
| 3,134,944 | 5/1964 | Newman | 324—158 |

WALTER L. CARLSON, *Primary Examiner.*

E. L. STOLARUN, *Assistant Examiner.*